(12) United States Patent
Heix et al.

(10) Patent No.: US 8,478,756 B2
(45) Date of Patent: Jul. 2, 2013

(54) CONTEXTUAL DOCUMENT ATTRIBUTE VALUES

(75) Inventors: Andreas Heix, Heidelberg (DE); Achim Weigel, Kaiserslautern (DE); Lars Erbe, Karlsruhe (DE)

(73) Assignee: SAP AG, Walldorf (DE)

( * ) Notice: Subject to any disclaimer, the term of this patent is extended or adjusted under 35 U.S.C. 154(b) by 479 days.

(21) Appl. No.: 11/779,783

(22) Filed: Jul. 18, 2007

(65) Prior Publication Data

US 2009/0024648 A1 Jan. 22, 2009

(51) Int. Cl.
*G06F 17/30* (2006.01)
*G06F 7/00* (2006.01)

(52) U.S. Cl.
USPC ........................................................ 707/736

(58) Field of Classification Search
USPC ............. 707/102, 3, 6, 7, 706, 711, 718, 721, 707/722, 736, 738, 748
See application file for complete search history.

(56) References Cited

U.S. PATENT DOCUMENTS

| 6,883,001 | B2 * | 4/2005 | Abe | 1/1 |
|---|---|---|---|---|
| 2002/0016800 | A1 * | 2/2002 | Spivak et al. | 707/523 |
| 2004/0019613 | A1 * | 1/2004 | Jones et al. | 707/200 |
| 2004/0098362 | A1 * | 5/2004 | Gargi | 707/1 |
| 2005/0097462 | A1 * | 5/2005 | Lumera et al. | 715/522 |
| 2005/0165742 | A1 * | 7/2005 | Chin | 707/3 |
| 2007/0244859 | A1 * | 10/2007 | Trippe et al. | 707/3 |
| 2007/0244867 | A1 * | 10/2007 | Malandain et al. | 707/3 |

* cited by examiner

*Primary Examiner* — Usmaan Saeed
*Assistant Examiner* — MD. I Uddin
(74) *Attorney, Agent, or Firm* — Mintz, Levin, Cohn, Ferris, Glovsky and Popeo, P.C.

(57) ABSTRACT

Metadata is generated that contains attribute values for a first document that in turn contains one or more key words. The attribute values of the first document are based on contextual information such as attribute values associated with other documents that contain at least one of the key words. Once generated, the metadata may be associated with the first document. Related techniques, apparatuses, and articles are also described.

12 Claims, 1 Drawing Sheet

CONTEXTUAL DOCUMENT ATTRIBUTE VALUES

TECHNICAL FIELD

The subject matter described herein relates to the generation of contextual document attribute values.

BACKGROUND

As the number of documents being created or modified within systems such as portals, content management systems, file management systems, and the like, increases, so do the difficulties experienced by users in subsequently locating those documents (whether by text query, logical arrangement, etc.). Most systems allow users to generate at least some attribute values that characterize the contents of documents whether in the properties fields or as part of a searchable system in which key words can be associated with documents. In some systems, the generation or modification of a document will result in static default attribute values which provide little useful information for subsequent searches of relevant files if not modified by the user (which can be time consuming).

SUMMARY

In one aspect, metadata is generated that contains attribute values for a first document that in turn contains one or more key words. The attribute values of the first document are based on contextual information such as attribute values associated with other documents that contain at least one of the key words. Once generated, the metadata may be associated with the first document.

The generation of the metadata (e.g., pop-up graphical user interface, etc.), can be initiated after a triggering event such as creation of the first document, uploading of the first document, saving of the first document, and the like.

The second documents which are searched may be unlimited or, in some variations, limited only to documents that were associated (e.g., accessed by user, same user group as the user, workflow history, etc.) by the user of the first document.

Once the attribute values are generated, they can be modified by the user or in other implementations automatically saved. The attribute values can be modified by a user via a graphical user interface which may include fields for different attributes.

In an interrelated aspect, metadata containing attribute values for a first document is generated. The attribute values of the first document being based on attribute values from at least one second document. The second document being associated with a workflow history of the user of the first document. Thereafter, the generated metadata can be associated with the first document.

In still a further interrelated aspect, metadata containing attribute values for a first document upon a triggering event associated with the first document is generated. The first document contains one or more key words. The attribute values of the first document are based on attribute values from at least one second document previously accessed by a user of the first document that in turn contains at least one of the key words. After the metadata is generated, it is associated with the first document.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
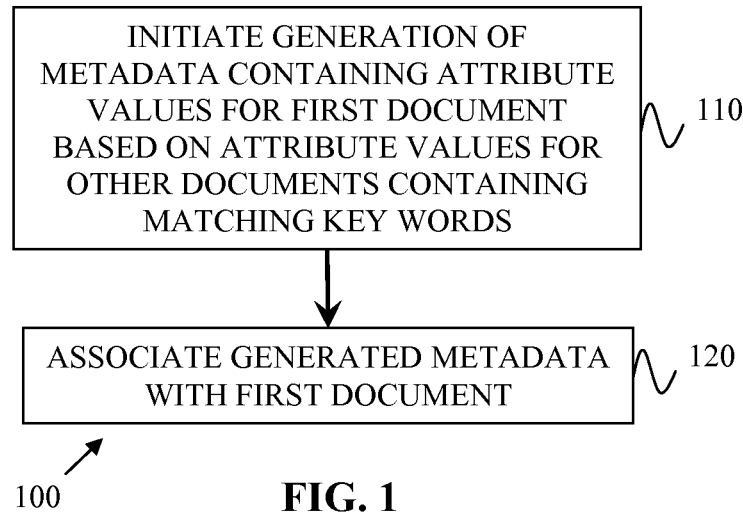
FIG. 1 is a process flow diagram illustrating the generation of attribute values for a first document based on attribute values of other documents having matching key words.

FIG. 1 is a process flow diagram illustrating a method 100 in which, at 110, the generation of metadata containing attribute values for a first document is initiated. This first document contains one or more key words. The attribute values of the first document are based on attribute values from at least one other second document that contains at least one of the key words from the first document. Thereafter, at 120, the generated metadata is associated with the first document.

Figure 2:
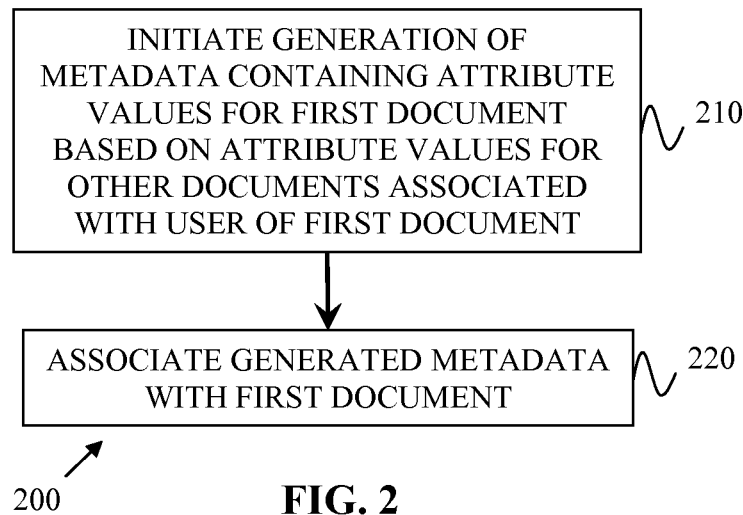
FIG. 2 is a process flow diagram illustrating the generation of attribute values for a first document based on attribute values of other documents associated with the user of the first document.

FIG. 2 is a process flow diagram illustrating a method 200 (interrelated to the method 100 of FIG. 1) in which, at 210, the generation of metadata containing attribute values for a first document is initiated. The attribute values of the first document are based on attribute values from at least one second document that is associated with a workflow history of the user of the first document. Next, at 220, the generated metadata is associated with the first document.

As used herein, the term document refers to a data file such as image media, audio files, word processing files, web pages, spreadsheets, visual slide presentations, and the like.

The current techniques and systems allow for the generation of contextual attribute values for documents which can be associated with such documents as metadata. The contextual attribute values can be useful in identifying areas such as topic, area, context, field of work a user is working in, and the like, so that the documents may be subsequently identified by a user (either the originating user or another user) when needed.

The underlying contextual information for the attribute values can come from a plurality of sources (which sources may be prioritized or otherwise ranked). For example, the contextual information may be based on whether other documents contain key words that match key words for the document for which the attribute values are being generated.

A search engine module may operate to identify and sort documents having matching key words so that suggested attribute values are presented according to relevancy or other priority rankings (e.g., historical, originating source, etc.). For example, documents from one source may be given priority over documents from another source.

The documents polled/indexed by the search engine may be based on a variety of factors such as whether the user previously accessed, modified, or created the document, the modification or generation date of the document (e.g., only documents within the last month are searched, etc.), location of the document (e.g., physical system, folder, etc.), as well as application context.

The contextual information may alternatively or additionally be based on factors such as application context, location of the document (e.g., folder, database, etc.), the workflow history of the user (e.g., documents accessed within the last two weeks, last ten documents accessed, etc.), and the like.

Once the attribute values are generated, they can, in some implementations, be presented to the user. The user can then make any changes he or she deems appropriate via a graphical user interface to enhance the relevance of the attribute values. As an alternative, the attribute values can be automatically generated and associated with a document.

The generation of the attribute values may be based on a variety of triggering events. For example, the triggering event might be a user uploading the document to a portal. The triggering event might comprise the creation of the document and/or the saving of the document. In some implementations, the attribute values for a document are automatically generated each time a triggering event occurs.

In one example, the current techniques are incorporated into a document control system. Such a document control system generates a searchable index which users may search in order to locate previously generated documents. The searchable index can be created via a user entering information into various fields for each document such as document name, document author, document description, type of document, related project, and the like. When the user first saves a new document, one or more of these fields can be populated with contextual attribute values generated in accordance with the techniques described herein. The user can then have the option to modify these fields or simply accept them without change. The document control system may also allow users to modify pre-existing attribute values as may be needed.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The subject matter described herein provides many advantages. For example, rather than providing static default attribute values, contextual document attribute values are generated or proposed for a document which can be further tailored by a user. By ensuring that document attributes are contextual, subsequent location and searching of the documents is greatly enhanced while reducing user effort required to generate such document attribute values. Moreover, the current subject matter can be used for determining recipients for e-mails because information having common attribute values are often sent to the same group of individuals. Furthermore, the subject matter described herein may be used to build a profile of a user's knowledge based on extracted key words used for generating and/or proposing attribute values.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a non-transitory machine-readable storage medium embodying instructions that when performed by one or more machines result in operations comprising:

initiating generation of metadata using a pop-up graphical user interface for a first document generated by a user, the first document containing one or more key words;

extracting the one or more key words from the first document to build a profile of a user's knowledge based on extracted key words used for generating and proposing attribute values;

polling a search engine to identify and sort among a first plurality of documents, at least one second document having key words matching the extracted one or more key words, the at least one second document having associated attribute values from a plurality of prioritized and ranked sources, the attribute values of the second document being associated with a workflow history of the user of the first document and the attribute values are presented according to relevancy and priority rankings, the search engine limiting the first plurality of documents to documents previously accessed by the user within a pre-defined time period;

wherein the attribute values for the document are automatically generated each time triggering an event, wherein the event includes uploading the document to a portal, creating the document and saving the document;

presenting a graphical user interface comprising fields for values for the metadata, at least a portion of the fields being populated with values corresponding to at least a portion of the attribute values of the at least one second document;

receiving user-generated input via the graphical user interface to accept the modification of the attributes values;

generating, in response to the user-generated input, the metadata for the first document using the values in the presented graphical user interface; and associating the generated metadata with the first document, wherein a user can search for the first document by using at least one of the one or more keywords of the first document and the attribute values of the first document.

2. An article as in claim 1, wherein the initiating occurs after a triggering event.

3. An article as in claim 1, wherein the at least one second document is associated with a user of the first document.

4. An article as in claim 1, wherein the metadata is integrated into the first document.

5. An article as in claim 1, wherein the metadata is persisted separately from the first document.

6. A method for implementation by at least one data processor forming part of at least one computing system, the method comprising:

initiating generation of metadata using a pop-up graphical user interface for a first document generated by a user containing plurality of key words;

extracting the one or more key words from the first document to build a profile of a user's knowledge based on extracted key words used for generating and proposing attribute values;

polling a search engine to identify and sort among a first plurality of documents, at least one second document having key words matching the extracted one or more key words, the at least one second document having associated attribute values from a plurality of prioritized and ranked sources, the attribute values of the second document being associated with a workflow history of the user of the first document and the attribute values are presented according to relevancy and priority rankings, the search engine limiting the first plurality of documents to documents previously accessed by the user within a pre-defined time period;

wherein the attribute values for the document are automatically generated each time triggering an event wherein the event includes uploading the document to a portal, creating the document and saving the document;

presenting a graphical user interface comprising fields for values for the metadata, at least a portion of the fields being populated with values corresponding to at least a portion of the attribute values of the at least one second document;

receiving user-generated input via the graphical user interface to accept the modification of the attributes values;

generating, in response to the user-generated input, the metadata for the first document using the values in the presented graphical user interface; and associating the generated metadata with the first document, wherein a user can search for the first document by using at least one of the one or more keywords of the first document and the attribute values of the first document.

7. An article as in claim 6, wherein one or more key words of the first document match one or more key words of the at least one second document.

8. An article as in claim 6, wherein the metadata is integrated into the first document.

9. An article as in claim 6, wherein the metadata is persisted separately from the first document.

10. A system comprising:

at least one data processor; and memory storing instructions, which when executed by the at least one data processor, result in operations comprising:

initiating generation of metadata using a pop-up graphical user interface for a first document generated by a user upon a triggering event associated with the first document, the first document containing one or more key words;

extracting the one or more key words from the first document to build a profile of a user's knowledge based on extracted key words used for generating and proposing attribute values;

polling a search engine to identify and sort among a first plurality of documents, at least one second document having key words matching the extracted one or more key words, the second document keywords including having associated attribute values from a plurality of prioritized and ranked sources, the attribute values selected from a group consisting of: an author of the second document, a name of the second document, a description of the second document, a type of the second document and projects related with the second document, the attribute values of the at least one second document being used to generate attribute values for the first document, the generating comprising obtaining contextual information from content of the second document and identifying the attribute values for the first document based on the contextual information of the second document and the attribute values are presented according to relevancy and priority rankings, the search engine limiting the first plurality of documents to documents previously accessed by the user within a pre-defined time period;

wherein the attribute values for the document are automatically generated each time triggering an event wherein the event includes uploading the document to a portal, creating the document and saving the document;

presenting a graphical user interface comprising fields for values for the metadata, at least a portion of the fields being populated with values corresponding to at least a portion of the attribute values of the at least one second document;

receiving user-generated input via the graphical user interface to accept the modification of the attributes values;

generating, in response to the user-generated input, the metadata for the first document using the values in the presented graphical user interface; and associating the generated metadata with the first document, wherein a user can search for the first document by using at least one of the one or more keywords of the first document and the attribute values associated with the first document, and wherein the user can search for the second document by using at least one of the keywords of the second document and the attribute values associated with the second document.

11. An article as in claim 10, wherein the metadata is integrated into the first document.

12. An article as in claim 10, wherein the metadata is persisted separately from the first document.

* * * * *